Oct. 12, 1954  J. A. FOTIE  2,691,714
WELDING MACHINE
Filed May 21, 1951  6 Sheets-Sheet 1

Fig. 1.

INVENTOR.
Joseph A Fotie
BY
ATTORNEY.

Oct. 12, 1954  J. A. FOTIE  2,691,714
WELDING MACHINE
Filed May 21, 1951  6 Sheets-Sheet 2

Fig. 2.

INVENTOR.
Joseph A. Fotie
BY

ATTORNEY.

Oct. 12, 1954  J. A. FOTIE  2,691,714
WELDING MACHINE

Filed May 21, 1951  6 Sheets-Sheet 3

Fig. 3.

INVENTOR.
Joseph A. Fotie
BY 
ATTORNEY.

Oct. 12, 1954  J. A. FOTIE  2,691,714

WELDING MACHINE

Filed May 21, 1951  6 Sheets-Sheet 4

INVENTOR.
Joseph A. Fotie
BY
ATTORNEY.

Oct. 12, 1954   J. A. FOTIE   2,691,714
WELDING MACHINE

Filed May 21, 1951   6 Sheets-Sheet 5

INVENTOR.
Joseph A. Fotie
BY
ATTORNEY.

INVENTOR.
Joseph A. Fotie

ATTORNEY.

Patented Oct. 12, 1954

2,691,714

UNITED STATES PATENT OFFICE 2,691,714

WELDING MACHINE

Joseph A. Fotie, Kansas City, Mo., assignor to Rex Welder & Engineering Co., Kansas City, Mo., a corporation of Missouri Application May 21, 1951, Serial No. 227,443

9 Claims. (Cl. 219—4)

This invention relates to electric welding machines particularly of the kind adapted for producing wire mats wherein is included a plurality of spaced, longitudinal wires having cross wires superimposed thereon and welded thereto at the point of crossing.

In the machine forming the subject matter of the present invention, a relatively large number of spaced, longitudinally extending wires are advanced through the machine simultaneously and intermittently, the wires being spaced as may be pre-desired and covering an area according to the width of the mat to be produced. A cross wire is fed to the longitudinal wires in correspondence with each advancement of the latter and such cross wire is thereupon also advanced to a welding station. Obviously, the spacing between the cross wires is determined by the extent of advancement of the longitudinal wires during each step-by-step operation of the machine and the synchronized speed of operation of the feeding mechanism.

It is thus far clear that it is absolutely esssential that the cross wires be fed and advanced in a manner to assure welding thereof to each longitudinal wire and that the most difficult problems in machines of this character lies in such positive welding at all points of crossing. The problem is enhanced by virtue of the material itself and while it is not particularly difficult to maintain the longitudinal wires in a straight, unkinked condition, a greater problem is presented in holding the cross wires in a substantially straight condition so as to be engaged directly and accurately by the welding electrodes at the point of crossing. Accompanying such problems are that of feeding the cross wires so that the spaces therebetween are maintained substantially the same and avoiding progressive increase or decrease of such distances as the machine is placed in continuous operation over a relatively long period of time.

It is the most important object of the present invention therefore, to provide a mat producing machine of the aforesaid character wherein the cross wires are fed to a rotatable drum having a number of longitudinally extending slots formed in the periphery thereof for receiving the cross wires, the slots being co-extensive in length with the cross wire and there being provided means in conjunction with the drum for gripping the wires from the slots individually in timed relationship with the advancement of the longitudinal wires of the mat.

It is a further object of this invention to provide a welding machine wherein is included a number of annular grooves in the rotatable cross wire-receiving drum that intersect the slots thereof and including additionally, a finger extending to each groove respectively for stripping the cross wires from the slots thereof as the wires are brought into engagement with the fingers by rotation of the drum.

It is another object of this invention to provide a welding machine having the cross wire feeding assembly as just above set forth and including a covering tube for the drum having an outlet opening into which the fingers extend and through which the cross wires are fed, the tube serving to close the slots and thereby hold the cross wires therewithin until removed for deposit upon the longitudinal wires.

Another important object of the present invention is to provide a novel table arrangement along which the longitudinal wires are advanced and upon which the cross wires are fed, the primary distinguishing feature of the table lying in the provision of a number of sections each individually mounted for floating movement and each having spring means for maintaining the same biased against the wires sliding thereon.

It is another object of this invention to provide a welding machine wherein the sections of the aforesaid table are each grooved for receiving the longitudinal wires, such wires as the cross wires all being yieldably held against the stripping fingers of the cross wire feeding assembly by the springs of the table sections.

A still further object of this invention is to provide in the cross wire feeding mechanism, a reciprocable plate that slides along the upper surface of the sectional table and against the cross wires as the same are fed upon the table and accordingly, upon the longitudinal wires to a position for welding between relatively moving series of welding electrodes.

Many additional objects for accomplishing the accuracies initially set forth herein, will be made clear or become apparent as the following specification progresses, reference being had to the accompanying drawings, wherein.

The welding machine forming the subject matter of the present invention necessarily includes a large number of detailed features forming no part of the present invention and thus, except for its novel characteristics, the machine has been shown in its assembled form and its operation need be described only by its broad aspects.

Figure 1:
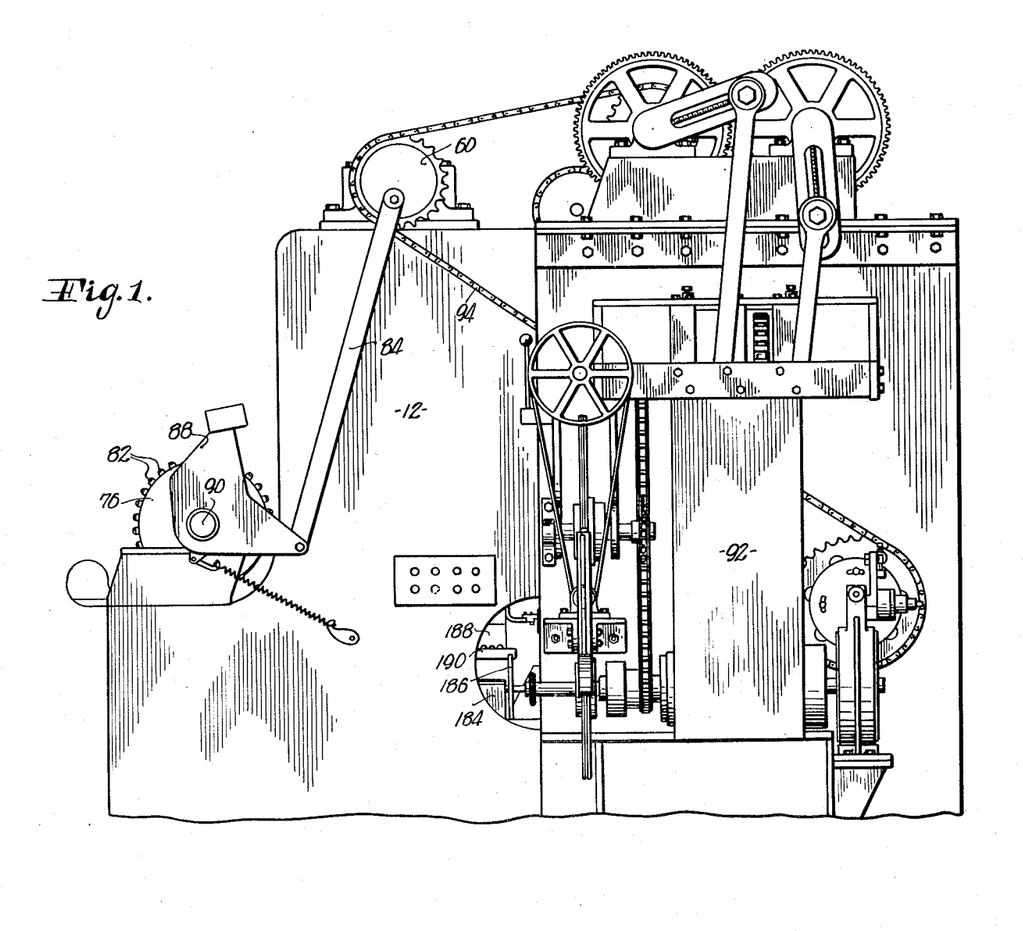
Figure 1 is an end elevational view of a welding machine made according to the present invention.
Figure 2:
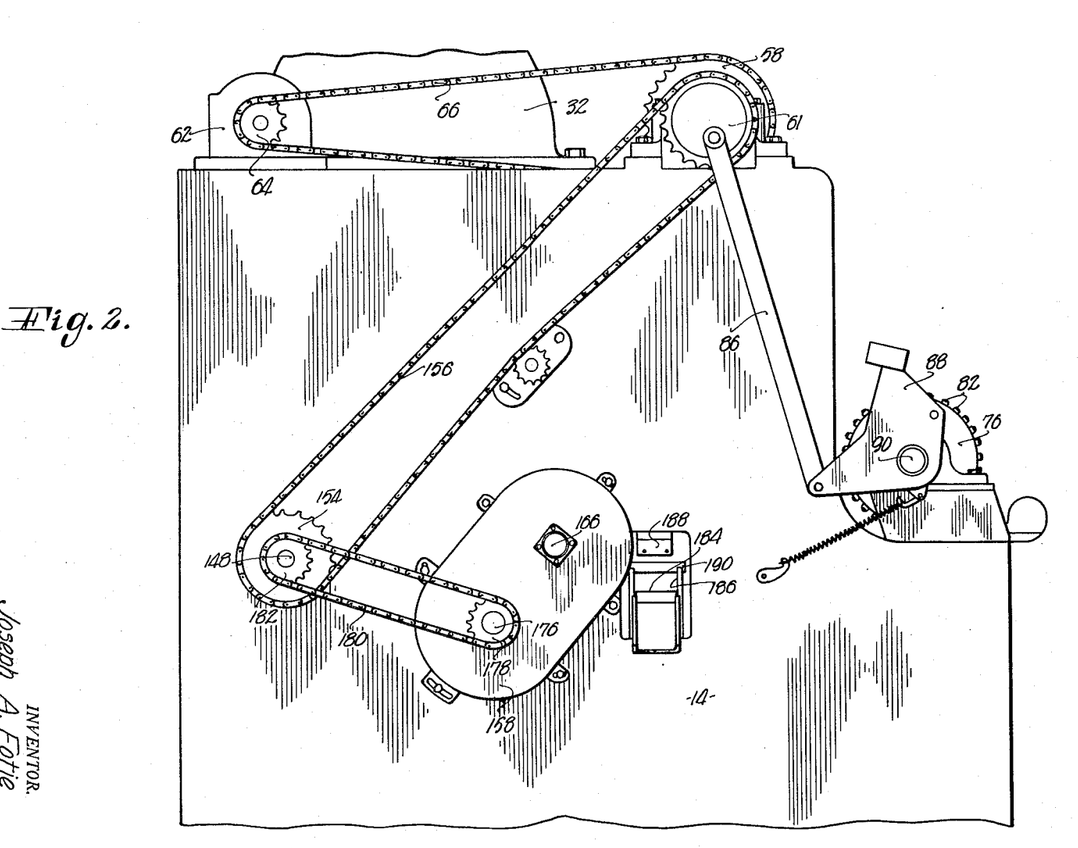
Fig. 2 is an elevational view showing the opposite end thereof.

The supporting framework includes a pair of end walls 12 and 14 as illustrated in Figs. 1 and 2 respectively, that are joined by a plurality of structural elements (see Fig. 3) including a pair of lowermost, horizontal beams 16, a pair of center beams 18 (see also Figs. 4—6), a pair of uppermost beams 20, together with auxiliary members 22, 24, 26 and 28 that interconnect the walls 12 and 14 and operate to support various parts of the mechanism between walls 12 and 14 as will hereinafter be set forth. The beams 20 mount a top plate 30 (Fig. 3) for receiving a prime mover 32, together with various other elements including speed reducers, shafts and gearing (Figs. 1—3); and vertical standards 34 (one only being shown in Fig. 3) between one of the beams 18 and its overlying beam 20 serve to additionally stabilize the top plate 30.

Figure 3:
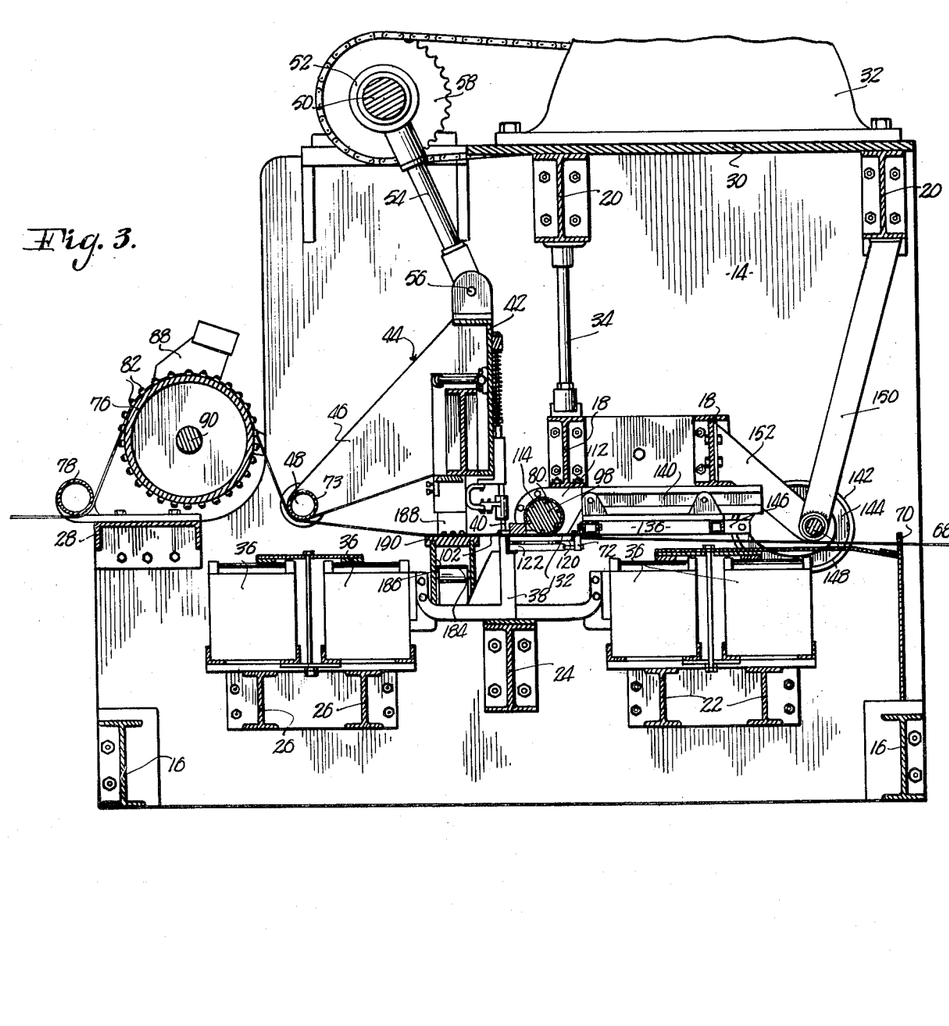
Fig. 3 is a substantially, central, vertical, cross-sectional view taken on the transverse axis of the machine.

Substantially all of the electrical apparatus forming a part of the welding machine hereof, is contained within a number of elongated housings 36 extending longitudinally of the machine between walls 12 and 14 and carried by beams 22 and 26 respectively as is most clear in Fig. 3 of the drawings. The beam 24 functions to support a series of stationary welding electrodes 38 having a common, horizontal, uppermost surface, such electrodes being illustrated in Figs. 3 to 6 inclusive of the drawings. See Fig. 6 for the side-by-side disposition of the electrodes 38. There is provided a vertically reciprocable electrode 40, only one of which is seen in Figs. 1, 3, 4 and 5, for each stationary electrode 38 and movable toward and away therefrom upon energization of electric motor or other prime mover 32.

The series of spring-loaded movable welding electrodes 40 extending substantially the entire distance between walls 12 and 14, are mounted upon a vertical plate 42 forming a part of an auxiliary frame 44 having arms 46 (one only being shown in Fig. 3) that are pivotally secured to a cross shaft 48 directly above the beams 26 and adjacent beam 28. Accordingly, the electrodes 40 pass through a slight arc as they move toward and away from the stationary electrodes 38 upon swinging of the secondary frame 44 on shaft 48. Such swinging movement is occasioned by rotation of a shaft 50 extending the entire length of the machine and carried by the upper plate 30 thereof (Fig. 3). Shaft 50 is provided with a number of eccentrics 52 that join with the secondary frame 44 through corresponding links 54 that are in turn pivotally connected with the frame 44 as at 56. One of these eccentrics 52 and its link 54 are shown in Fig. 3. The shaft 50 is provided with sprocket wheels 58, 60 (Fig. 1) and 61, the former of which joins with speed reducer unit 62 through its sprocket wheel 64 by means of a continuous chain 66 as shown in Figs. 2 and 3.

Figure 12:
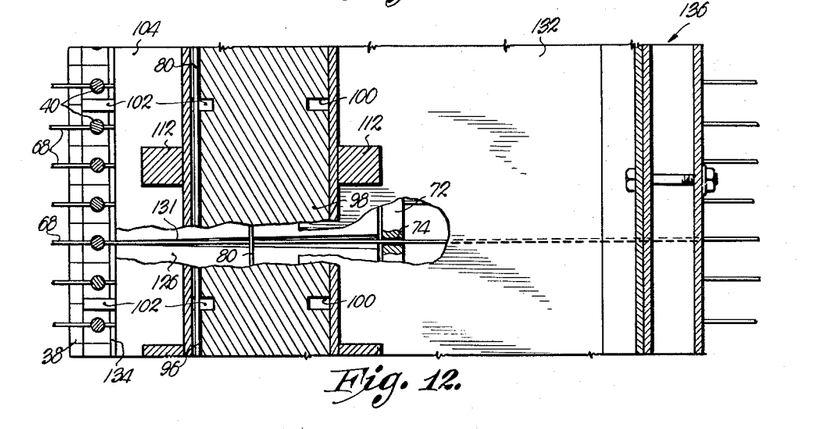
Fig. 12 is an enlarged, fragmentary, horizontal, cross-sectional view taken on line XII—XII of Fig. 5.

The longitudinal wires 68 (Figs. 3—5) forming a part of the mat to be produced by the welding machine hereof, are first fed through a plate 70 that is in turn provided with an opening for each wire 68 respectively to guide the same, it being noted in Fig. 3 that plate 70 is disposed substantially midway between one of the beams 16 and the beam 20 directly thereabove. Wires 68 are additionally guided during advancement thereof by an elongated, horizontal bar 72 (Figs. 3—6) having an opening 74 (Fig. 6) therein for each wire 68 respectively, the bar 72 being supported as hereinafter to be made clear directly below that beam 18 having standards 34 thereon. From the bar 72 the longitudinal wires 68 extend between the electrodes 38 and 40, as best seen in Fig. 12, and beneath the auxiliary frame 44 where the same pass beneath a roller 73 on shaft 48, (Fig. 3) and thence over a horizontal, rotatable drum 76 (Figs. 1—3 and 9) and beneath a second roller 78 carried by the beam 28 (Fig. 3).

Assuming the cross wires 80 (Figs. 4 and 5) to have been welded to the plurality of longitudinal wires 68, rotation of the mat-receiving drum 76 operates to pull the wires 68 through the machine along the path of travel just above traced, together with the cross wires 80 that are affixed thereto. As shown most clearly in Fig. 10 of the drawings, drum 76 is provided with a spirally arranged series of spaced-apart, removable lugs 82 that not only engage the cross wires 80 to effect the pulling force upon the wires 68 and the completed part of the mat, but being properly and carefully spaced operate to hold the mat in a proper position for the exact amount of intermittent movement needed and to prevent lateral shifting thereof within the welding machine.

Figure 10:
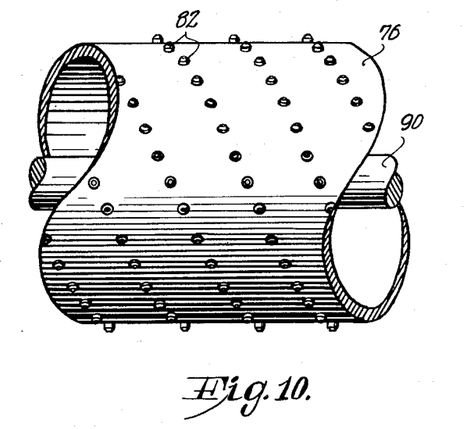
Fig. 10 is a fragmentary, enlarged, elevational view of the mat-receiving drum shown in Figs. 1 to 3 inclusive.

It is to be noted in Fig. 10 of the drawings that the lugs 82 in addition to being spirally wound, are so spaced as to provide a number of parallel rows thereof, each extending the full length of the drum 76, together with a number of parallel rows of lugs 82 that circumscribe the drum 76. Accordingly, each longitudinally extending row of lugs 82 engages a cross wire 80 and one or more rows of lugs 82 that circumscribe the drum 76 are disposed between the longitudinal wires 68.

Intermittent rotation of the drum 76 anti-clockwise viewing Fig. 3 of the drawings is accomplished through the provision of elongated links 84 and 86 eccentrically connected at one end thereof to sprocket wheels 60 and 61 respectively, each having a crank 88 pivotally secured to the lowermost end thereof. (See Figs. 1 and 2). The cranks 88 are connected with shaft 90 for the drum 76 through suitable clutch means not shown for preventing rotation of the drum 76 clockwise viewing Fig. 3 of the drawings.

An assembly for directing the cross wires 80 into the machine is shown in Fig. 1 mounted on the outer face of wall 12 and broadly designated by the numeral 92. While the entire assembly 92 forms no particular part of the present invention, it is seen that the same is driven from the prime mover 32 by means of a continuous chain 94 connected with the sprocket wheel 60. Assembly 92 forces the cross wires 80 into an aligned slot 96 formed in a drum 98 that is rotatable between the walls 12 and 14 substantially immediately below the beam 18 having standards 34 thereon and on one side of the electrodes 38 and 40 opposite to the auxiliary frame 44. (See Figs. 3-6).

Figure 6:
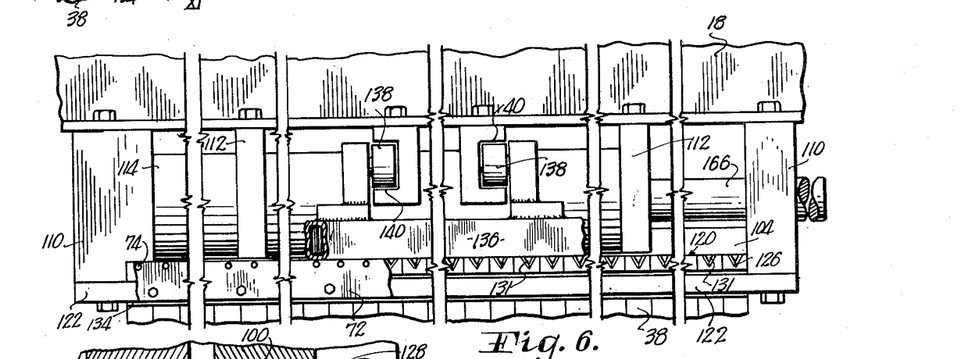
Fig. 6 is an enlarged, fragmentary, elevational view illustrating the motivating carriage for the cross wire advancing plate, parts being broken away and in section to reveal details of construction of the sectional wire-receiving table.
Figure 7:
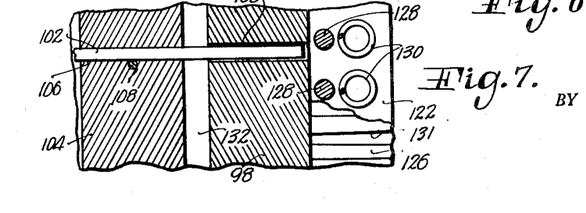
Fig. 7 is a fragmentary, cross-sectional view taken on irregular line VII—VII of Fig. 4.
Figure 8:
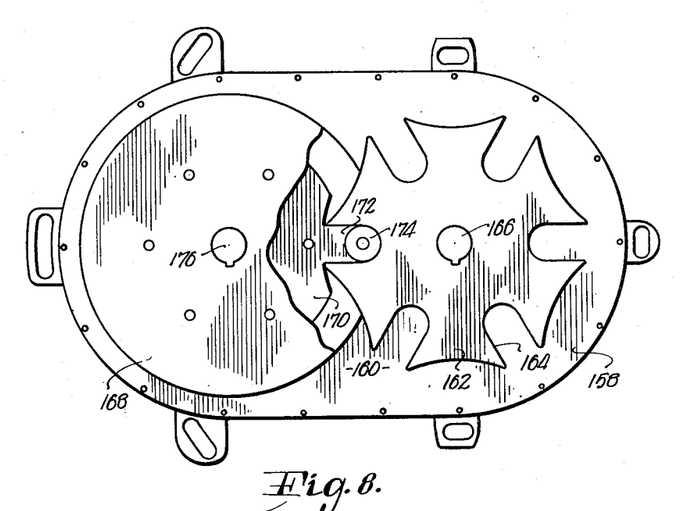
Fig. 8 is an enlarged, elevational view of the gearing within the case shown in Fig. 2, for imparting intermittent rotation to the cross wire feeding drum.
Figure 9:
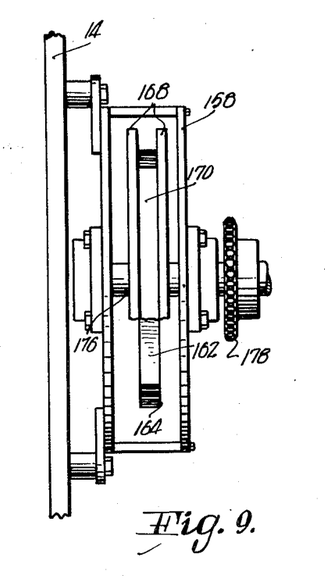
Fig. 9 is an edge elevational view thereof.
Figure 11:
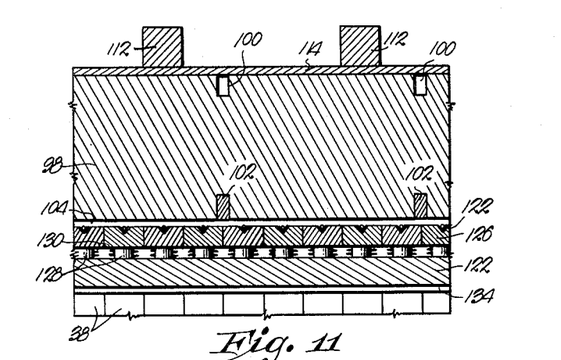
Fig. 11 is an enlarged, fragmentary, vertical, cross-sectional view taken on line XI—XI of Fig. 5.

The drum 98 is provided with a plurality of spaced-apart, parallel, horizontal slots 96 that extend the entire length thereof and which are intersected by a number of annular grooves 100 that circumscribe the drum 98 as shown best in Figs. 11 and 12. Accordingly the grooves 100 are in communciation with the slots 96 and each receive an elongated, horizontal finger 102 that is carried by a bar 104 extending between walls 12 and 14 and suitably slotted as at 106 on its lowermost face for reception of the fingers 102 extending transversely of bar 104. A setscrew 108 or like fastening means adjacent each slot 106, is provided for adjustably and rigidly mounting the fingers 102 to their supporting bar 104 (Fig. 7). The beam 18, next adjacent the drum 98, is provided with a plurality of depending frame pieces 110 and 112 (Fig. 6) to which the bar 104 is directly affixed and maintained in a horizontal plane between drum 98 and the electrodes 38 and 40 as is clear in Figs. 4 and 5.

The frame pieces 110 and 112 also operate to support an elongated tube 114 (Figs. 3-6) that partially circumscribes the drum 98 and therefore, closes certain of the slots 96. Tube 114 coextensive in length with the drum 98 has an elongated outlet openings 116 (Figs. 3-5) extending its entire length adjacent the bar 104 and into which the fingers 102 extend for disposition within the corresponding grooves 100 of drum 98 as seen in Figs. 4, 7, 11 and 12. It is important to note at this point that each finger 102 is provided with a beveled, downwardly-facing, innermost end as at 118. (See Figs. 4 and 5).

A horizontal table, broadly designated by the numeral 120 (in Figs. 3-7) and extending substantially the entire distance between walls 12 and 14 directly underlies the drum 98 and particularly the outlet opening 116 of tube 114. Table 120 is supported by an underlying, elongated bar 122 carried by the frame pieces 110, and it is upon this bar 122 that the perforated guide bars 72 for the wires 68 are directly and rigidly mounted.

Figure 4:
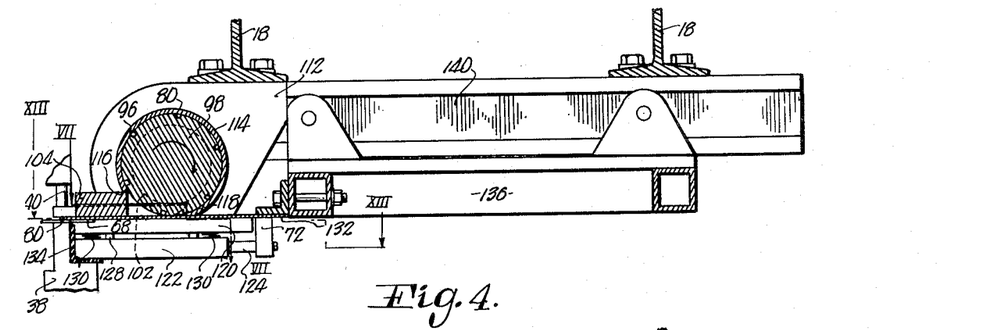
Fig. 4 is an enlarged, fragmentary, detailed, cross-sectional view similar to Fig. 3 and illustrating the cross wire feeding assembly.
Figure 5:
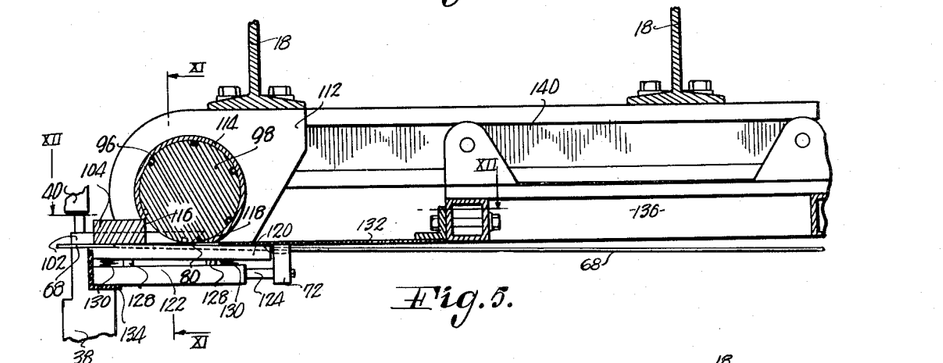
Fig. 5 is a cross-sectional view similar to Fig. 4 illustrating the cross wire advancing plate at one end of its path of travel opposite to that shown in Fig. 4.

A plurality of spacers 124 between one edge of the bar 122 and the bar 72, hold the latter spaced away from the table 120 in the manner shown in Figs. 4 and 5 of the drawings. Table 120 is composed of a relatively large number of individual elongated sections 126 disposed transversely of bar 122 and each in turn being individually and separately mounted for vertical floating movement toward and away from the bar 122 that supports the same.

Bar 122 has a pair of spaced, upstanding pins 128 (Figs. 4, 5 and 7) for each section 126 respectively of table 120, and the sections 126 are provided with openings (not shown) for receiving the pins 128, the latter thereby guiding the sections 126 as the same move toward and away from bar 122. Additionally, a pair of springs 130 are interposed between bar 122 and each section 126 respectively, there being cavities both in the bar 122 and in the sections 126 for receiving the springs 130 and holding the same against lateral displacement. Note in Fig. 11 the table 120 with one row of the upstanding pins 128, one for each section 126 respectively, together with one row of the springs 130.

Figure 13:
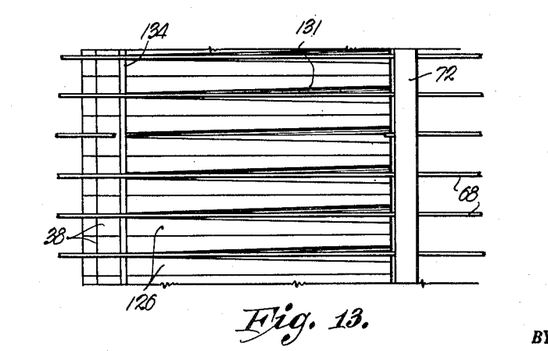
Fig. 13 is an enlarged, fragmentary, cross-sectional view taken on line XIII—XIII of Fig. 4.

Accordingly, as is clear in Fig. 11, the entire table 120 is held biased upwardly toward the bar 104, the fingers 102, the tube 114 and toward a flat, horizontal, elongated plate 132 that extends substantially the entire distance between walls 12 and 14 and rests upon the uppermost edge of the bar 72, plate 132 and bar 72 being broken away in Fig. 12 to show one of the openings 74. An L-shaped flange 134 (Figs. 4 and 5) secured directly to the bar 122 extends upwardly into partial overlapping relationship to one end of the table 120 as an auxiliary support therefor. Each section 126 respectively of the table 120 is provided with a longitudinally extending groove 131 in the upper face thereof. It is noted in Figs. 6 and 11 that the grooves 131 are V-shaped in cross-section and as shown in Figs. 7, 12 and 13 of the drawings, each groove 131 respectively becomes progressively narrower as the flange 134 is approached. Fig. 5 illustrates by dotted lines the way in which the grooves 131 become progressively shallower as the bar 104 is approached. Obviously each groove 131 registers at its deepest and widest end with a corresponding opening 74 in the bar 72 as shown in Fig. 12.

The plate 132 is reciprocated toward and away from electrodes 38 and 40 through the medium of a carriage 136 upon which it is directly mounted, carriage 136 having a number of rollers 138 guided within a pair of spaced, horizontal tracks 140 in turn carried by the beams 18 (see Figs. 3-6). Reciprocation of carriage 136 takes place through the medium of a pair of cams, one only of which is illustrated in Fig. 3 of the drawings, and designated by the numeral 142.

Cams 142 each have an egg-shaped groove 144 therein for receiving a corresponding roller not shown, and mounted upon extension 146 of the carriage 136 as shown in Fig. 3. A rotating shaft 148 upon which the cams 142 are directly mounted, extends between walls 12 and 14 and is suitably braced and supported by framework 150 and 152 extending between one of the beams 20 and one of the beams 18 respectively. Shaft 148 has a sprocket wheel 154 thereon (Fig. 2) for receiving a continuous chain 156 that passes over sprocket wheel 61 thereby providing rotative force for the shaft 148 from prime mover 132.

A casing 158 on the outer face of wall 14, receives a modified form of Geneva gearing 160 for imparting intermittent rotative movement to the drum 98 through chain 156. A gear 162 having a plurality of notches 164 is connected directly to a shaft extension 166 (Figs. 2 and 6) of drum 98.

A pair of plates 168 held apart by an interconnecting spacer 170 therebetween, receives a portion of the gear 162, spacer 170 having a lateral extension 172 provided with a roller 174 and adapted to be received by notches 164. Plates 168 and the spacer 170 are mounted on a stub shaft 176 that in turn receives a sprocket wheel 178 exteriorly of casing 158 and a continuous chain 180 joins the sprocket wheel 178 with a sprocket wheel 182 on shaft 148.

A continuous conveyor belt 184 driven in any suitable manner not shown, underlies the auxiliary frame 44 and extends through an opening 186 in wall 14. Belt 184 underlies cutters 188 carried by the auxiliary frame 44 and cooperating with stationary members 190 therebelow in cutting the cross wires 80 if desired at various points therealong to predetermine the width of the mat or mats emanating from rollers 78. It is to be noted however, that the initial severance of the cross wires 80 between drum 98 and the assembly 92 is accomplished by the shearing action of drum 98 as the same rotates relative to the feeding means for assembly 92. Continuous belt 184 operates to receive fragments of the cross wires 80 when cutting means 188 are placed in use and to carry the same free of the machine exteriorly of the wall 14 through outlet 186.

In summary, Figs. 11–13 illustrate the nature and disposition of the table 120 and its associated parts, as well as the fingers 102 that extend into the grooves 100 of the drum 98. Fig. 12 particularly, shows how the longitudinal wires 68, fed beneath the carriage 136 from perforations 70 (Fig. 3), underlie the plate 132, pass through the openings 74, thence in the grooves 131, beneath the bar 104, and between the electrodes 38 and 40. The nature of the uppermost face of the lowermost half 126 of the table 120, and particularly the grooves 131 therein, can be easily understood from Fig. 13.

Fig. 12 also shows the cross wires 80 contained in the grooves 96 and illustrates the manner in which the wires 80 cross the wires 68 as they are pushed along with the longitudinally moving wires 68 to a welding position between the electrodes 38 and 40. The spring-loaded, uppermost bars 126 of the table 120 are shown in cross-section in Fig. 11, as are the fingers 102 extending into the grooves 100.

In operation, energization of prime mover 32 operates to drive the drum 76 for intermittent rotation through links 86, cranks 88 and the clutching arrangement forming a part thereof. Such rotation of the drum 76 operates through lugs 82 to advance the longitudinal wires 68 and accordingly, the cross wires 80 that have been welded thereto. The drum 98 rotates in unison with the drum 76 by virtue of gearing 150 and while drum 98 is stationary, the assembly 92 operates to force a cross wire 80 into one of the slots 96, preferably the uppermost of such slots 96.

As drum 98 rotates in the direction of the arrow shown in Fig. 4 of the drawings, a cross wire 80 will be forced against the plurality of rigid fingers 102 and particularly against and beneath the inclined edges 118 thereof. Fingers 102 therefore, strip the wire 80 from its slot 96 and cause the same to move from within the tube 114 for deposit upon the longitudinal wires 68 that are in turn supported by the table 120 in corresponding grooves 131. As soon as the cross wire 80 is deposited on the table 120 and therefore, on the wires 68 in intersecting relationship to the latter as seen in Fig. 12, carriage 136 operating through shaft 148 and cams 142, moves from the position shown in Fig. 5 of the drawing to the position shown in Fig. 4. Plate 132 accordingly moves to a position between the lowermost extremity of tube 114 adjacent outlet opening 116 and the table 120, springs 130 yielding accordingly. Plate 132 is also forced against the deposited cross wire 80, sliding the latter horizontally beneath the rigid fingers 102 along the table 120 transversely of the latter to a point of welding between electrodes 38 and 40.

It is to be noted that the entire horizontal leading edge of the plate 132 opposite to carriage 136 contacts the cross wire 80 throughout its length and while wire 80 is being moved along table 120, it is held clamped in sliding engagement with not only the table 120 but the fingers 102 by virtue of springs 130. Forming of the table 120 to a plurality of sections 126 and providing spring means 130 for each section 126 respectively, effects a holding means for the wire 80 that prevents its kinking and bending out of shape prior to connection to the wires 68 by operation of welding electrodes 38 and 40 while the wires 68 and one of the cross wires 80 are between electrodes 38 and 40.

It is to be noted further that the grooves 131 progressively guide the wires 68 upwardly toward the fingers 102 and also guide the wires 68 to a median point vertically with respect to the electrodes 38 and 40 as can be appreciated by viewing Figs. 12 and 13. Just prior to the welding operation therefore, both the longitudinal wires 68 and the cross wires 80 are held tightly together and tightly against the fingers 102 by the action of the relatively large number of springs 130 holding the table upwardly biased against the crossed wires 68 and 80.

The machine is properly synchronized for swinging movement of the frame 44 through links 54 and eccentrics 52 to move the electrodes 40 downwardly against the cross wires 80 at the moment the same are moved to a position between electrodes 38 and 40 by the reciprocable plate 132. As the plate 132 returns to the position shown in Figs. 5 and 12 from the position shown in Fig. 4, the drum 98 rotates to deposit another wire 80 upon the table 120, drum 76 and plate 132 operating simultaneously to advance the entire mat, as well as the cross wire 80 next to be welded.

Having thus described the invention what is claimed as new and desired to be secured by Letters Patent is:

1. In a welding machine, wire feeding structure comprising an elongated, rotatable drum having a number of longitudinally-extending, wire-receiving slots spaced around the periphery thereof, and a number of spaced, transverse, annular grooves intersecting said slots; and a finger extending into each groove respectively for stripping the wires from the slots as the drum is rotated.

2. In a welding machine, wire feeding structure comprising an elongated, rotatable drum having a number of longitudinally-extending, wire-receiving slots spaced around the periphery thereof, and a number of spaced, transverse, annular grooves intersecting said slots; an elongated, stationary tube partially covering said drum and closing said slots, said tube having an outlet opening extending longitudinally thereof; and a finger extending into each groove respectively through said outlet opening for stripping the wires from the slots as the drum is rotated.

3. In a welding machine, wire feeding structure comprising an elongated, rotatable drum having a number of longitudinally-extending, wire-receiving slots spaced around the periphery thereof, and a number of spaced, transverse, annular grooves intersecting said slots; a finger extending into each groove respectively for stripping the wires from the slots as the drum is rotated; a wire-receiving table beneath the drum; and reciprocable means on the table for engaging the wires fed to the table and shifting the same to a welding position.

4. In a welding machine, wire feeding structure comprising an elongated, rotatable drum having a number of longitudinally-extending, wire-receiving slots spaced around the periphery thereof, and a number of spaced, transverse, annular grooves intersecting said slots, a finger extending into each groove respectively for stripping the wires from the slots as the drum is rotated; a wire-receiving table beneath the drum; reciprocable means on the table for engaging the wires fed to the table and shifting the same to a welding position; and yieldable means for holding the table biased toward the fingers to maintain the reciprocable means and the wires in engagement with the fingers as the wires are shifted.

5. In a welding machine, wire feeding structure comprising an elongated, rotatable drum having a number of longitudinally-extending, wire-receiving slots spaced around the periphery thereof, and a number of spaced, transverse, annular grooves intersecting said slots; a finger extending into each groove respectively for stripping the wires from the slots as the drum is rotated; a wire-receiving table beneath the drum; reciprocable means on the table for engaging the wires fed to the table and shifting the same to a welding position, said table including a plurality of floatingly mounted sections; and yieldable means for each section respectively for holding the same biased toward the fingers to maintain the reciprocable means and the wires in engagement with the fingers as the wires are shifted.

6. In a welding machine, wire feeding structure comprising an elongated, rotatable drum having a number of longitudinally-extending, wire-receiving slots spaced around the periphery thereof, and a number of spaced, transverse, annular grooves intersecting said slots; a finger extending into each groove respectively for stripping the wires from the slots as the drum is rotated; a wire-receiving table beneath the drum; and an elongated, reciprocable plate on the table for engaging the wires throughout the lengths thereof at one edge of the plate as the same are fed to the table and shifting the same to a welding position.

7. In a welding machine, wire feeding structure comprising an elongated, rotatable drum having a number of longitudinally-extending, wire-receiving slots spaced around the periphery thereof, and a number of spaced, transverse, annular grooves intersecting said slots; an elongated, stationary tube partially covering said drum and closing said slots, said tube having an outlet opening extending longitudinally thereof; a finger extending into each groove respectively through said outlet opening for stripping the wires from the slots as the drum is rotated; a wire-receiving table beneath the drum; and reciprocable means between the table and the tube for engaging the wires fed to the table through said outlet opening and shifting the same to a welding position.

8. In a welding machine, wire feeding structure comprising an elongated, rotatable drum having a number of longitudinally-extending, wire-receiving slots spaced around the periphery thereof, and a number of spaced, transverse, annular grooves intersecting said slots; an elongated, stationary tube partially covering said drum and closing said slots, said tube having an outlet opening extending longitudinally thereof; a finger extending into each groove respectively through said outlet opening for stripping the wires from the slots as the drum is rotated; a wire-receiving table beneath the drum; reciprocable means between the table and the tube for engaging the wires fed to the table through said outlet opening and shifting the same to a welding position; and yieldable means for holding the table biased toward the tube to maintain the reciprocable means in engagement with the tube and the fingers and the wires in engagement with the fingers as the wires are shifted.

9. In a welding machine, wire feeding structure comprising an elongated, rotatable drum having a number of longitudinally-extending, wire-receiving slots spaced around the periphery thereof, and a number of spaced, transverse, annular grooves intersecting said slots; an elongated, stationary tube partially covering said drum and closing said slots, said tube having an outlet opening extending longitudinally thereof; a finger extending into each groove respectively through said outlet opening for stripping the wires from the slots as the drum is rotated; a wire-receiving table beneath the drum; reciprocable means between the table and the tube for engaging the wires fed to the table through said outlet opening and shifting the same to a welding position, said table including a stationary bar and a plurality of separate sections, individually mounted on the bar for movement toward and away from the tube; and yieldable means between the bar and each section respectively for holding the sections biased toward the tube to maintain the reciprocable means in engagement with the tube and the fingers and the wires in engagement with the fingers as the wires are shifted.

References Cited in the file of this patent

UNITED STATES PATENTS

| Number | Name | Date |
|---|---|---|
| 633,213 | Perry | Sept. 19, 1899 |
| 1,093,297 | Southwick | Apr. 14, 1914 |
| 1,581,868 | Reed | Apr. 20, 1926 |
| 2,410,766 | Wickwire | Nov. 5, 1946 |

FOREIGN PATENTS

| Number | Country | Date |
|---|---|---|
| 589,148 | France | Feb. 17, 1925 |